United States Patent
Blanchard et al.

(10) Patent No.: US 7,604,762 B2
(45) Date of Patent: Oct. 20, 2009

(54) HIGH-DENSITY GLASS FIBRE GRANULES

(75) Inventors: Jean-Francois Blanchard, Les Marches (FR); Jean-Louis Viana, Cruet (FR); Michel Bastard, Gresy sur Aix (FR); Dominique Font, Saint Baldoph (FR)

(73) Assignee: OCV Intellectual Capital, LLCDE (US)

(*) Notice: Subject to any disclaimer, the term of this patent is extended or adjusted under 35 U.S.C. 154(b) by 0 days.

(21) Appl. No.: 10/512,859

(22) PCT Filed: May 21, 2003

(86) PCT No.: PCT/FR03/01538
§ 371 (c)(1),
(2), (4) Date: Nov. 15, 2004

(87) PCT Pub. No.: WO03/097543
PCT Pub. Date: Nov. 27, 2003

(65) Prior Publication Data
US 2005/0214524 A1    Sep. 29, 2005

(30) Foreign Application Priority Data
May 22, 2002   (FR) .................................. 02 06201

(51) Int. Cl.
*B29C 67/24* (2006.01)
*B29C 67/02* (2006.01)
(52) U.S. Cl. .................................................... 264/123
(58) Field of Classification Search ................. 264/117, 264/123
See application file for complete search history.

(56) References Cited

U.S. PATENT DOCUMENTS

| 471,243 | A | * | 3/1892 | Mishler | ....................... 425/333 |
| 1,504,302 | A | * | 8/1924 | Adams | ....................... 425/432 |
| 3,110,572 | A | | 11/1963 | Von Reppert | |
| 3,743,464 | A | | 7/1973 | Strobert | |
| 3,969,100 | A | * | 7/1976 | Kuna et al. | ..................... 65/27 |
| 4,238,537 | A | * | 12/1980 | Kerr | .......................... 428/35.7 |
| 5,472,917 | A | | 12/1995 | Talling et al. | |
| 6,365,090 | B1 | * | 4/2002 | Strait et al. | ................. 264/494 |

FOREIGN PATENT DOCUMENTS

RU    2082684 C1    6/1997

(Continued)

*Primary Examiner*—Christina Johnson
*Assistant Examiner*—Patrick Butler
(74) *Attorney, Agent, or Firm*—James J. Dottavio; Kathryn W. Grant

(57) ABSTRACT

A method for preparing glass strand pellets by stirring chopped glass strands in the presence of 10 to 25% of water, the strands being sized with a size containing an organosilane. The method performs stirring for long enough for an increase in density to be at least 67%, the stirring being performed using a single stirring equipment that at each instant imparts to the strands or forming pellets it contains the same stirring frequency, the pellets finally formed containing, after drying, at least 95 wt % glass. A film-forming agent is in contact with the glass strands during the stirring at the latest.

21 Claims, 7 Drawing Sheets

FOREIGN PATENT DOCUMENTS

| | | |
|---|---|---|
| RU | 2090525 C1 | 9/1997 |
| WO | 96/40595 | 12/1996 |
| WO | 98/43920 | 10/1998 |
| WO | 00/62916 | 10/2000 |
| WO | 01/05722 | 1/2001 |
| WO | WO01/49627 A1 | 7/2001 |
| WO | 02/04106 | 1/2002 |
| WO | 02/04107 | 1/2002 |
| WO | WO 03/053875 A3 | 7/2003 |

\* cited by examiner

HIGH-DENSITY GLASS FIBRE GRANULES

CROSS-REFERENCE TO RELATED APPLICATIONS

The present application is the U.S. counterpart of WO 03/097543, and in turn claims priority to French Application no. 02/06201 filed on May 22, 2002, the entire contents of each of which are hereby incorporated herein by reference.

The invention relates to the preparation of glass strand pellets by stirring glass strands. The glass strands concerned can be used to reinforce polymer-based thermoplastics, more commonly known as RTPs (for reinforced thermoplastics) and known in French as TPAs, for "thermoplastique armé". The thermoplastics concerned are especially polyolefins such as polyethylene or polypropylene, polyamides or polybutylene terephthalate.

The manufacture of fiber-reinforced thermoplastics using chopped glass strands passes through a phase of compounding and mixing a thermoplastic polymer and chopped glass strands in an extruder. This preparation is performed at a high enough temperature for the polymer to be fluid enough and for the final reinforced thermoplastic composition to be as uniform as possible. Specifically, the presence of clumps of strands in the thermoplastic generally results in inferior mechanical properties (particularly in terms of impact strength) and/or a degraded surface finish.

In general, the extruder performs the following functions:
it filamentizes (that is to say breaks down) the clumps of glass strands,
it compounds the glass strands with the thermoplastic matrix as uniformly as possible,
it heats the glass strands/thermoplastic compound to a temperature above the softening temperature of the thermoplastic, then produces an extruded bead of glass strands/thermoplastic compound, it being possible for said extruded bead to be cut up to turn it into pellets.

The chopped (glass) strand is usually in the form of an assembly of many individual filaments. These strands form an integral whole, possibly containing, for example, from 10 to 4000 filaments. The filaments may have a diameter ranging from 5 to 24 µm, for example about 10 µm or about 14 µm.

In order to make the glass strands easier to handle, attempts are made at agglomerating them, for example into the form of clumps such as pellets or granules. Indeed, such clumps are easier to handle and to meter out than traditional chopped strands. In addition, these clumps have a higher apparent bulk density and the same mass of glass strands therefore takes up a smaller amount of volume, something which is equally beneficial from the points of view of storage, of transport and of handling. This density, measured using the standardized ISO 15100 method, needs to be high enough to give economic transport costs and easy and reliable metering on entering the extruder. The term density used in this application is indeed this apparent density determined by ISO 15100.

The clumps (pellets in the case of the present invention) of chopped glass strand need to be intact enough that they do not deteriorate in use. Indeed, the various mechanical actions (transportation, unwrapping, conveying, metering) may give rise to the creation of "fines" that make the chopped strand unsuited to correct use. From another standpoint, this intactness must not be too great either because the clumps need to be opened up (that is to say broken down into individual filaments) at the appropriate moment and completely when compounded with the thermoplastic pellets in the extruder.

U.S. Pat. No. 4,840,755 describes a vibration method for slightly densifying the starting strands and making them into rod-like forms. The width with which the strands arrive is practically the same as that with which they leave.

WO9640595 (from the same family as U.S. Pat. No. 5,578, 535) relates to a composition comprising pellets obtained by hydration in order to obtain a water content from 11 to 20%, then by compounding the fibers for at least 3 minutes until pellets are formed, then drying said pellets. The ratio of the densities of the pellets to the starting strands is about 1.2 to 1.3.

WO9843920 (of the same family as U.S. Pat. Nos. 5,868, 982 and 5,945,134) relates to a method for manufacturing pellets involving the following successive steps: forming strands comprising a number of filaments, cutting the strands, applying a hydrating solution to the strands, dispersing the hydrating solution over the strands in a first tumbling operation in a first zone until pellets are formed, densifying the pellets by subjecting them to a second tumbling operation in a second zone. The pellets thus produced are cylindrical and have a diameter representing 20 to 65% of their length. According to that document, it is impossible to obtain sufficient densification if the operations of agglomeration (formation of pellets), on the one hand, and of densification, on the other, are not separated, by carrying them out in different apparatuses.

WO0149627 discloses a method for manufacturing pellets comprising the following successive steps: forming strands comprising a number of filaments sized with a first precursor, chopping the strands, applying a solution of a binder containing a copolymer of maleic anhydride and another copolymerizable monomer, dispersing the solution over the strands in a first tumbling operation in a first zone until pellets are formed, densifying the pellets by subjecting them to a second tumbling operation that is not as vigorous as the first in a second zone. An increase in density by 13 to 60% by comparison with the initial chopped strands is thus obtained. It is the existence of a second tumbling operation that allows greater densification, up to 60% increase over the chopped strands used, to be obtained.

The increase in productivity dictates that very harsh transport methods (for example pneumatic transport) be considered, this increase in productivity requiring, amongst other things, very high flowability properties in order to guarantee high feed rates and extremely precise metering.

Usually, the conventional chopped strand has a length of 3 or 4.5 mm, these lengths having been adopted because of the good compromise achieved between intactness and density. The need to make this compromise has hitherto always prevented producers of fibers for RTP from considering longer strands (for example 9 or 12 mm strands), because then the transport and metering of such strands are not suited to the conventional extruders. However, such an increase in length would have the advantage of increasing the residual length in the composite and therefore of improving the mechanical properties of the end composite. Given the developments of extruders to screw profiles capable of keeping the longest possible lengths, it is therefore possible to envision preparing longer glass strand pellets.

The advantages of this invention will be apparent upon consideration of the following detailed disclosure of the invention, especially when taken in conjunction with the accompanying drawings wherein.

Figure 1:
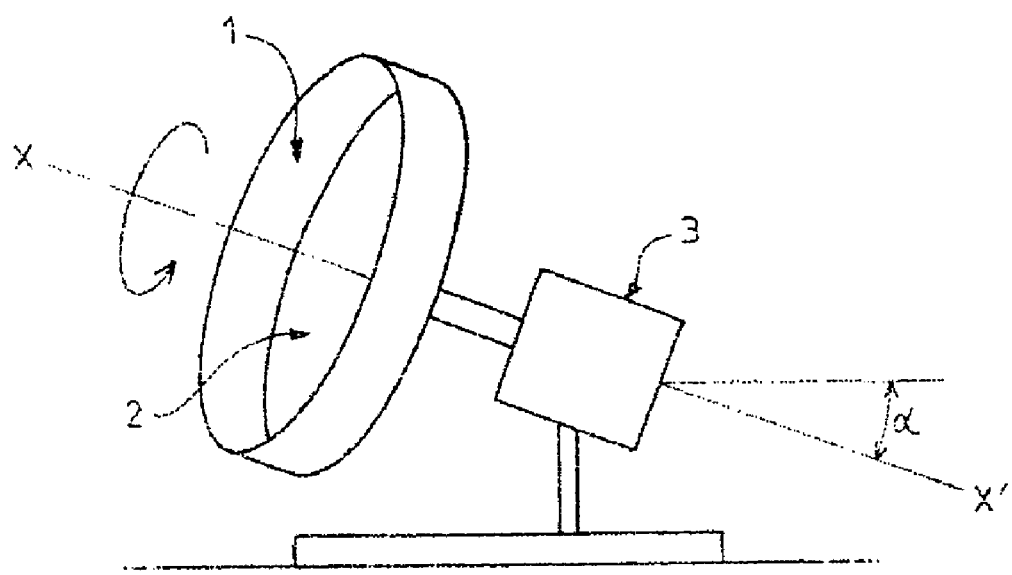
FIG. 1 is a schematic perspective view illustrating operating principles of the present invention.

The invention relates to a method for preparing glass strand pellets by stirring chopped glass strands in the presence of 10 to 25 wt % of water, said strands being coated with a size containing an organosilane, said method performing stirring for long enough for the increase in density to be at least 67%, this being performed using stirring equipment that, at each instant, imparts to the strands or equipment pellets forming, the same stirring frequency, the pellets finally formed containing, after drying, at least 95 wt %, or even at least 99 wt % it contains glass, a sticky (film former) agent being in contact with the glass strands during stirring at the latest.

In the pellets obtained using the invention, the "filaments" are more closely packed than in the simple fiber-forming operation using the bushing. The shape factor of the pellets leads to optimum density.

The glass strands used in the context of the invention are generally manufactured using the following succession of steps:

drawing the filaments in a damp atmosphere through bushings from molten glass, then coating the filaments with a sizing liquid, then, gathering the filaments together into strands, then, cutting the strands to form chopped glass strands.

At this stage, the chopped strands are wet. They generally contain from 5 to 25 wt % of water, for example 5 to 15 wt % of water. There is no need to dry them before introducing them into the stirring step according to the invention because this step has in any case to be performed in the presence of water. Thus, any additional water needed (with respect to the water supplied by the fiber drawing step) is added to the stirring apparatus in order to achieve a total water content (water due to the fiber drawing including the sizing water plus water added to the stirring apparatus) ranging from 10 to 25 wt % and preferably from 12 to 15 wt % of the mass introduced into the stirring apparatus. It is possible and preferable not to have to add additional water (to reduce the soiling of the pelletizer and increase the efficiency). To achieve this, all that is required is for the fiber forming to be performed at sufficient wetness to obtain correct pelletization.

The sizing liquid contains at least one organosilane. This organosilane generally contains at least one reactive group capable of reacting with the hydroxyl groups at the surface of the glass to graft the modified (in that its reactive group has reacted and therefore that it has lost part of the said reactive group) organosilane to the surface of the filaments. The organosilane used for the sizing operation is generally the hydrolyzed derivative of an alkoxysilane, itself generally containing the trialkoxysilane group, that is to say $-Si(OR)_3$, R representing a hydrocarbon radical such as a methyl or ethyl or propyl or butyl radical. The organosilane can therefore for example be the hydrolyzed derivative of one of the following compounds:

γ-aminopropyltriethoxysilane

γ-glycydoxypropyltrimethoxysilane.

The organosilane is generally present in the sizing solution at a rate of 0.05 wt % to 1 wt % and preferably 0.2 to 0.6 wt %. The sizing solution may also contain other ingredients, such as a film former, a lubricant, an antistatic agent. The sizing liquid may be a solution, an emulsion or a suspension.

Following the sizing step, the filaments are assembled into strands generally containing 10 to 4000 filaments, then chopped to the desired length. These two steps (assembly and chopping) are known per se to those skilled in the art. This then yields chopped glass strands sized with an organosilane. In general, the chopped strands used contain less than 200 ppm (in terms of weight) of fines (comprising from 1 filament to 10 agglomerated filaments).

The stirring apparatus may be any type of equipment capable of stirring the compound comprising the chopped strands without damaging them in any way. In order not to cause the strands in the pellets that are being formed to break up, the stirring must not to be too vigorous. The stirring imparts a repetitive movement to the chopped strands, then to the pellets being formed. The rotation frequency of the equipment may for example range from 10 to 50 revolutions per minute.

Figure 2:
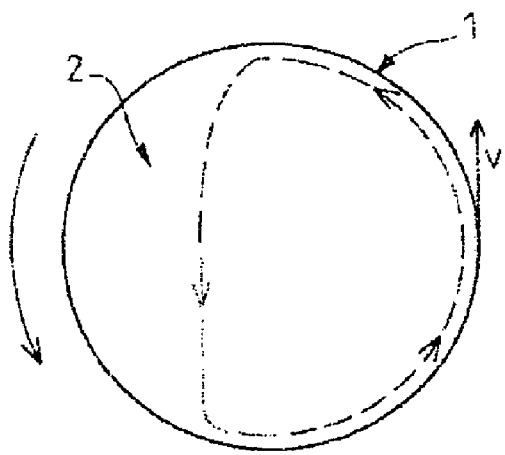
FIG. 2 is a schematic cross-sectional front view further illustrating operating principles of the present invention.

As a preference, the stirring is a tumbling operation, which means that the strands or pellets being formed are lifted up and fall back on themselves, tumbling, and this continues until the desired pellets are obtained. The pellet must not break up as it tumbles. As a preference, tumbling carries the strands or pellets it contains at a linear speed ranging from 0.2 to 1 meter per second and preferably 0.3 to 0.7 meter per second, particularly about 0.5 meter per second. This drive speed is that of the wall of the equipment coming into contact with the strands or pellets being formed in order to drive them. This linear speed can be represented by a vector tangential to the wall driving the strands or pellets, such as the vector v in FIG. 2.

The stirring according to the invention may be achieved in a single stirring step. This means that there is no need to resort to two different stirring equipment, for example for the start of stirring on the one hand and the end of stirring on the other. The stirring can therefore be performed in the one same equipment. In addition, in the case of a single stirring equipment, it is not necessary to form different stirring zones by modifying, for example, the geometry of the equipment into different zones, the various zones subjecting the pellets being formed to different stirring constraints. Different stirring constraints might, for example, be more or less vigorous tumbling, that is to say tumbling at different frequencies. The stirring apparatus can therefore have just one single stirring zone. From the start to the end of the stirring operation, the chopped strands and the pellets formed or being formed may be subjected to the same constraints by the stirring apparatus, particularly since, for example, the stirring frequency is constant. Thus, the equipment may be such that it affords stirring, particularly tumbling, the frequency of which is identical at every instant for its entire contents, that is to say for the chopped strands or the pellets being formed. In the case of tumbling, the tumbling frequency is generally higher than the rotational frequency of the equipment (number of revolutions per unit time) because as can be seen in particular from FIG. 9, when the equipment performs one revolution, the objects inside it can tumble on themselves several times. It is considered that the equipment drives everything it contains at the same frequency because all these objects are subjected to the same stirring constraints. The equipment may also be such that it drives the strands or pellets being formed at a linear speed that is constant from the start (chopped-strand stage) to the end of the preparation of the pellets.

The pellets may be prepared continuously by equipment imparting stirring at a constant frequency, from the starting chopped-strand stage right through to the end pellet stage.

The equipment may also contain partitions routing the pellets being formed so as to limit the mixing between pellets in the only slightly formed state and pellets in an advanced stage of formation.

The stirring equipment, more particularly the tumbling equipment, generally rotates about an axis and stirs everything it contains (from the chopped strands to the pellets) with the same frequency. At every instant, the equipment has just one rotational frequency (or radial speed of rotation). Everything that the equipment contains is stirred at the same frequency, this frequency generally being higher than the frequency of tumbling of the objects inside.

A tumbling operation may for example be carried out in a hollow cylinder rotating about its axis of revolution. The cross section of the cylinder may be cylindrical or may have another suitable shape, for example a polygonal, for example hexagonal, shape. The axis of revolution is preferably inclined to the horizontal by an angle ranging from 0 to 45°. Such a cylinder is depicted in FIG. 1. This cylinder comprises a tubular surface 1 and an end wall 2. In the variant of FIG. 1, the cylinder is not very deep (by comparison with its diameter) and could also be termed a plate. This cylinder has its axis of revolution XX' forming an angle alpha with the horizontal. This cylinder may be made to rotate about its axis of revolution by a motor 3. The chopped strands and the other ingredients of the compound are intended to be placed in the cylinder. It can be seen that the strands are tumbled and follow a path of the kind depicted in FIG. 2 with dotted arrows, said figure depicting the cylinder viewed in the direction of its axis of revolution, said cylinder comprising the tubular surface 1 and the end wall 2. In this variant, it is possible either to vary or not to vary the tumbling frequency during stirring. However, even if the frequency is varied during stirring, it is obvious that, at every instant, the tumbling frequency is the same for all the chopped strands and pellets contained in the equipment at the same time.

Figure 9:
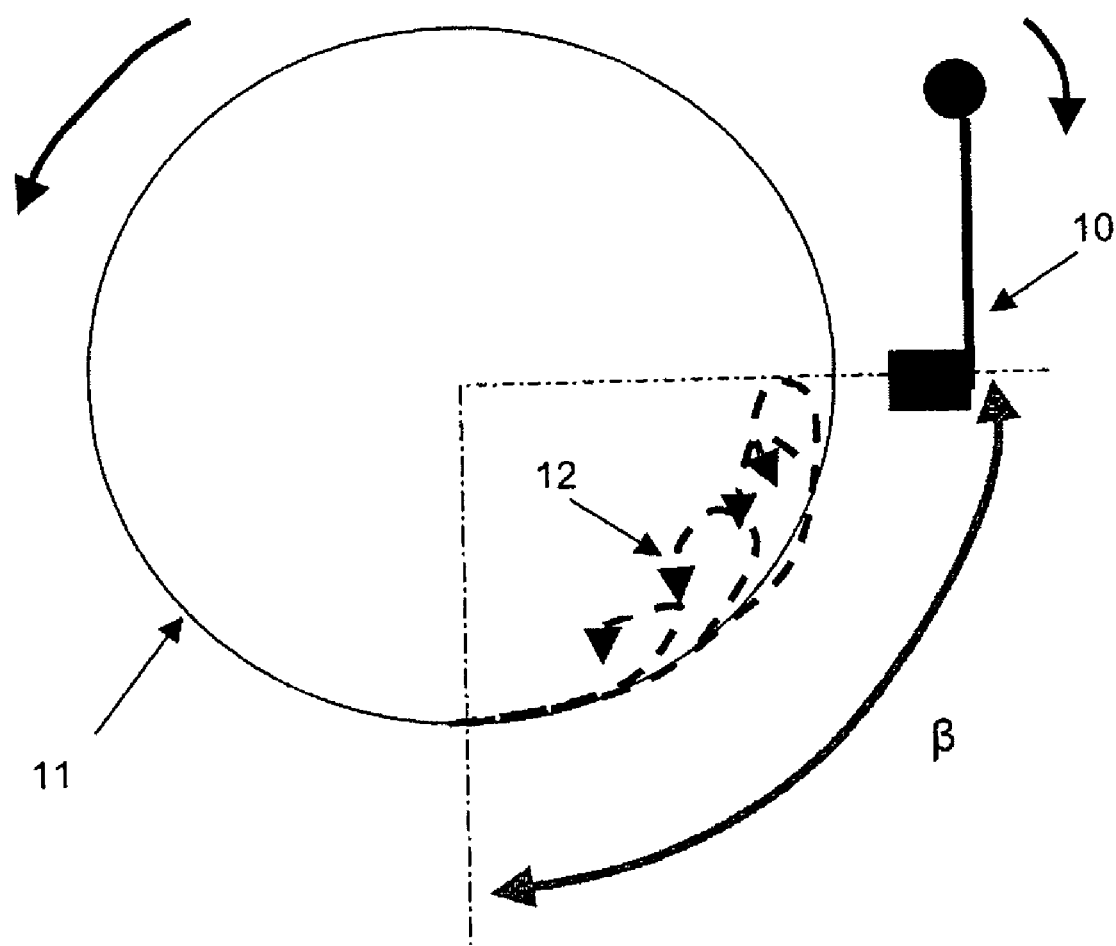
FIG. 9 is a schematic perspective view illustrating of an apparatus allowing a fourth implementation of the invention.

It is possible to assist the tumbling with hammer blows onto the rotating tumbling apparatus (cylinder or plate). FIG. 9 depicts such a variant. The hammer 10 periodically strikes the rotating apparatus 11, encouraging the strands or pellets being formed on the interior wall of the apparatus to detach. As a preference, the objects 12 contained in the apparatus tumble in the portion of angle β of about 90° between a vertical line and a horizontal line both passing through the axis of rotation.

Figure 4:
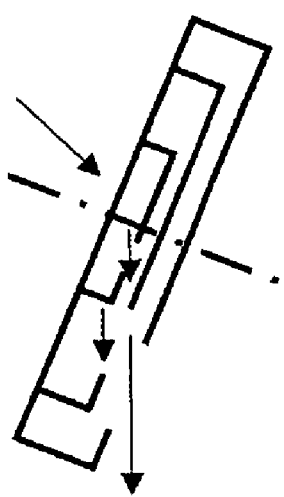
FIG. 4 is a cross-sectional aide view of an apparatus allowing a first implementation of the invention.
Figure 7:
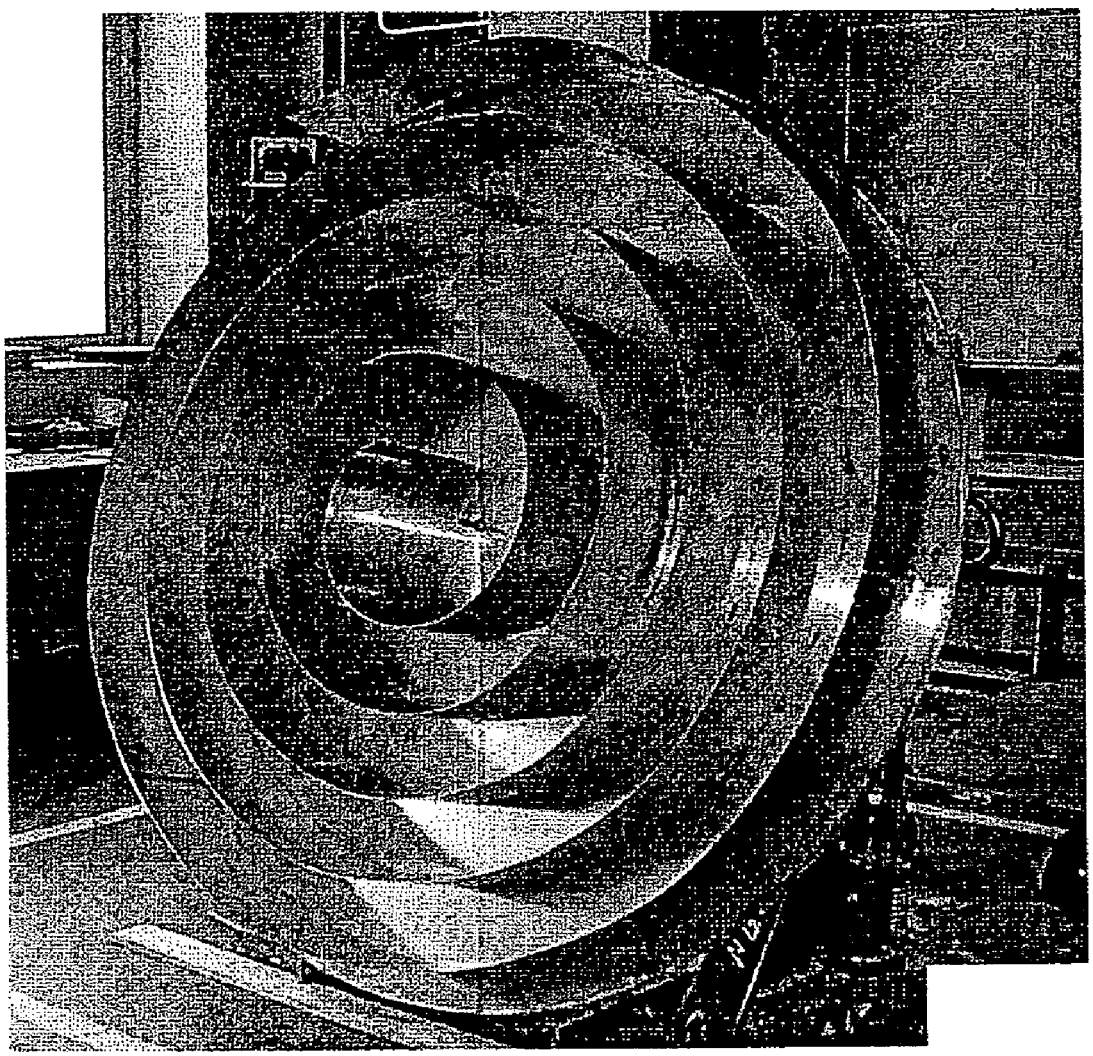
FIG. 7 is a photograph illustrating a perspective view an apparatus allowing a third implementation of the invention.
Figure 8:
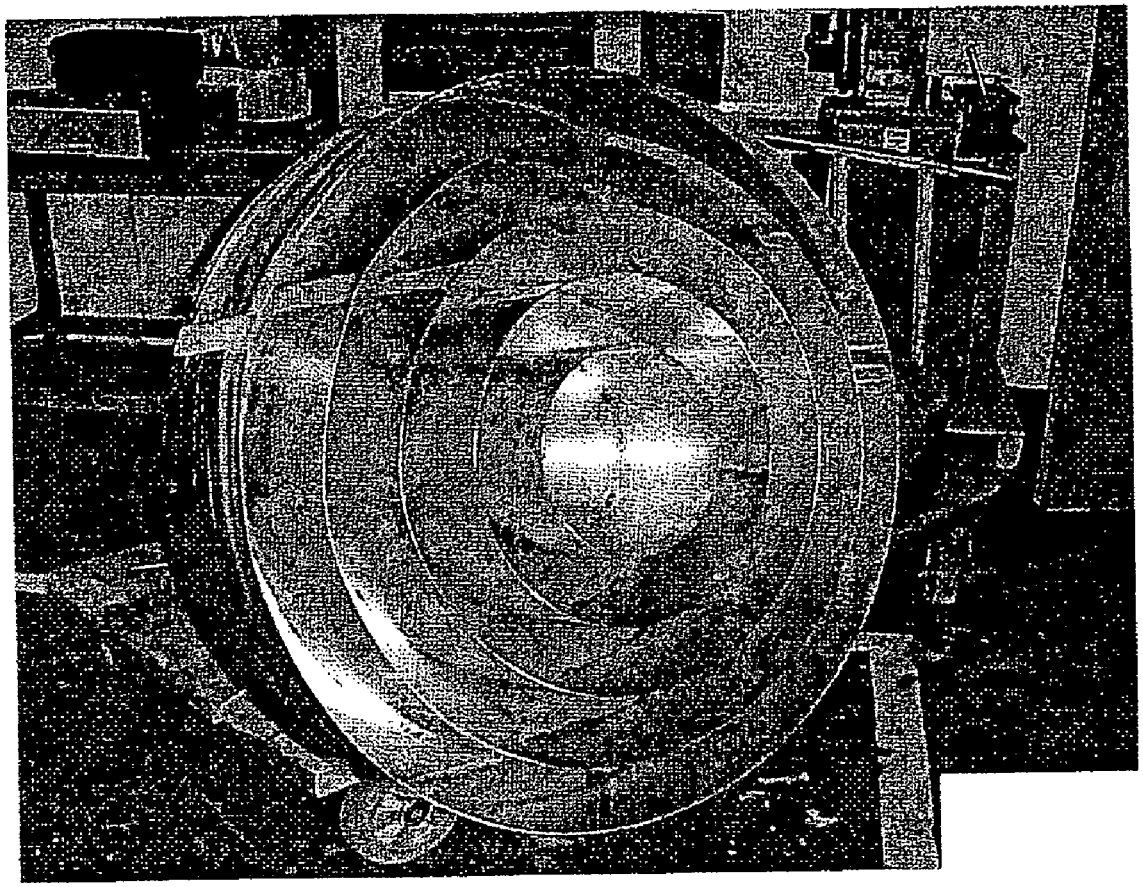
FIG. 8 is a photograph illustrating a perspective view of another variant of FIG. 4.

For a continuous industrial process, the cylinder may be a collection of several concentric sub-cylinders fixed one above the other, the pellets passing from one to the next through orifices. Such an assembly is depicted in FIG. 4, the path of the pellets being depicted using arrows. In this variant, the pellets pass from an upstream sub-cylinder to a downstream sub-cylinder having spent a certain residence time in the upstream sub-cylinder, and so on. Such circulation, by better separating the pellets according to their density, allows the spread on pellet particle size to be reduced. In addition, the proliferation of paths makes it possible to increase the residence time and therefore optimize the volume of the pelletizer with respect to the mass produced per unit time. The equipment therefore here contains partitions routing the pellets being formed so as to avoid, as much as possible, pellets in an early stage of formation mixing with pellets in an advanced stage of formation. Such equipment gives the same tumbling frequency (dependent on the rotational frequency of the equipment) to the chopped strands entering and to the pellets leaving. Even though everything the apparatus contains is tumbled at the same frequency, it is, however, found that the tumbled objects are distributed here over different radii and that the circumferential speed changes in each stage. It is therefore necessary for the equipment to be dimensioned and operated in such a way that the objects in the large diameters are not prevented from tumbling by centrifugal force and that the objects in the small diameters are spun fast enough that they can tumble. This apparatus therefore affords tumbling by way of stirring, the frequency of which tumbling at every instant is the same for the chopped strands (entering) and the pellets, including pellets being formed and pellets leaving. In this variant that can be used for continuous manufacture, the tumbling frequency is generally kept constant. FIGS. 7 and 8 show plate variants. FIG. 7 shows a spiral plate, a spiral-shaped partition parallel to the axis of revolution of the plate being secured to its base. The pellets being formed follow the spiral path dictated by the partition. The pellets are placed in the middle and re-emerge at the periphery. FIG. 8 shows a plate comprising a number of concentric partitions parallel to the axis of rotation of said plate, orifices in said partitions allowing the pellets being formed to pass from a volume between two partitions to an adjacent volume. This passage from one volume to the next is in the direction from the center toward the periphery.

Thus, stirring can be performed in a cylinder having the shape of a plate, with a diameter larger than its depth, said plate being equipped with partitions parallel to the axis of rotation and increasing the residence time of the pellets. The stirring apparatus receives the chopped strands at the center and the pellets leave via the periphery of the plate.

Figure 3:
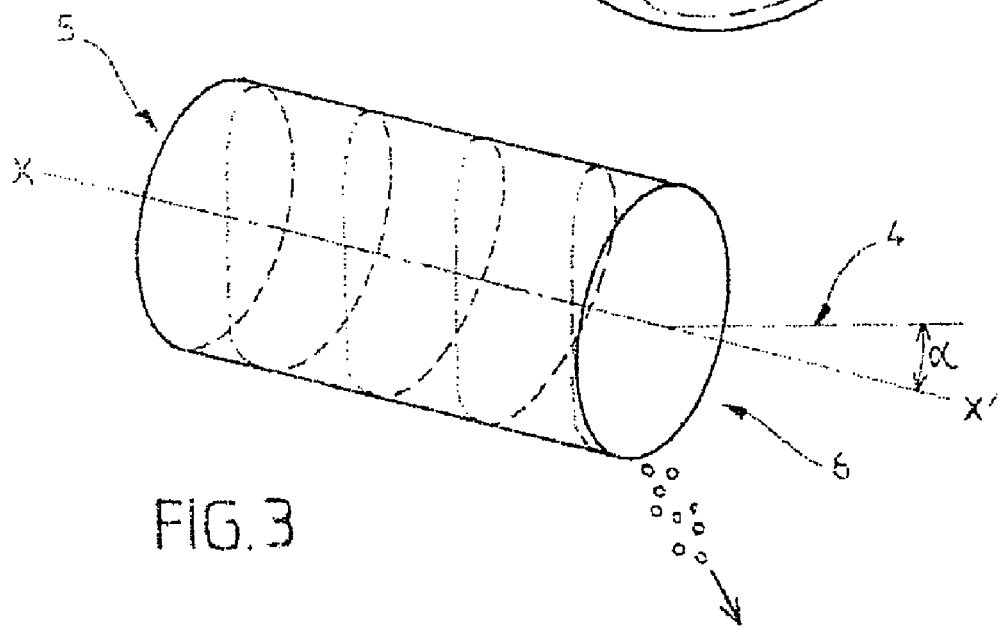
FIG. 3 is a schematic perspective view illustrating operating principles according to a variant of the present invention.
Figure 5:
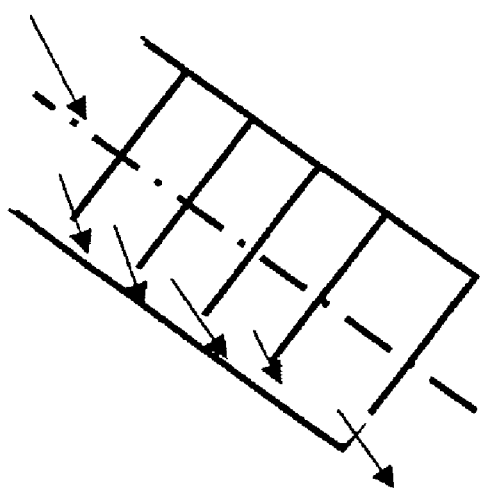
FIG. 5 is a cross-sectional side view of a variant of FIG. 4.

For a continuous industrial process it is also possible to use a hollow cylinder (a tube if the cross section of the cylinder is round) the axis of revolution of which is inclined to the horizontal and which comprises a long enough tubular surface for the strands being converted into pellets to travel from one end of the cylinder to the other. The cross section perpendicular to its axis of revolution may be round or have any other suitable shape, for example be polygonal, for example hexagonal. This cylinder may have a small amount of conicity (for example 5%), converging or diverging. The conicity is defined by the ratio, as a percentage (large diameter-small diameter)/length along the axis. The principle of such a cylinder is depicted in FIG. 3. The cylinder is inclined by an angle alpha to the horizontal 4. The chopped strands are loaded into the cylinder through one of its openings 5, the one at an elevated position by comparison with the other opening, the strands being converted into granules then following a path of the kind depicted in dotted line in FIG. 3, the formed pellets being recovered through the outlet opening 6, the one in the lowered position by comparison with the inlet opening 5. Such equipment is considered to have just one stirring zone because, from the start to the end of stirring, the chopped strands followed by the pellets being formed are subjected to the same stirring constraints by the equipment. The cylinder may also be a collection of several concentric sub-cylinders fixed one above the next, the pellets passing from one to the next through orifices. Such an assembly is depicted in FIG. 5, the path of the pellets being depicted using arrows. In this variant, the pellets pass from an upstream sub-cylinder to a downstream sub-cylinder having spent a certain residence time in the upstream sub-cylinder, and so on. Such circulation, by producing better segregation of the pellets according to their density, makes it possible to reduce the spread on the particle size of the pellets. The equipment therefore here contains partitions routing the pellets being formed in order to prevent as far as possible pellets at an early stage of formation from mixing with pellets at an advanced stage of formation. Here also, the equipment performs tumbling by way of stirring, the frequency of which tumbling at every instant is the same for the chopped strands (entering) and the pellets, including the pellets being formed and the pellets leaving. Here too, the tumbling frequency is generally kept constant and this equipment can also be used for continuous manufacture. The equipment in FIGS. 3 and 5 are examples for which the linear speed at which the strands and pellets are driven may be constant throughout the conversion of the strands into pellets.

Figure 6:
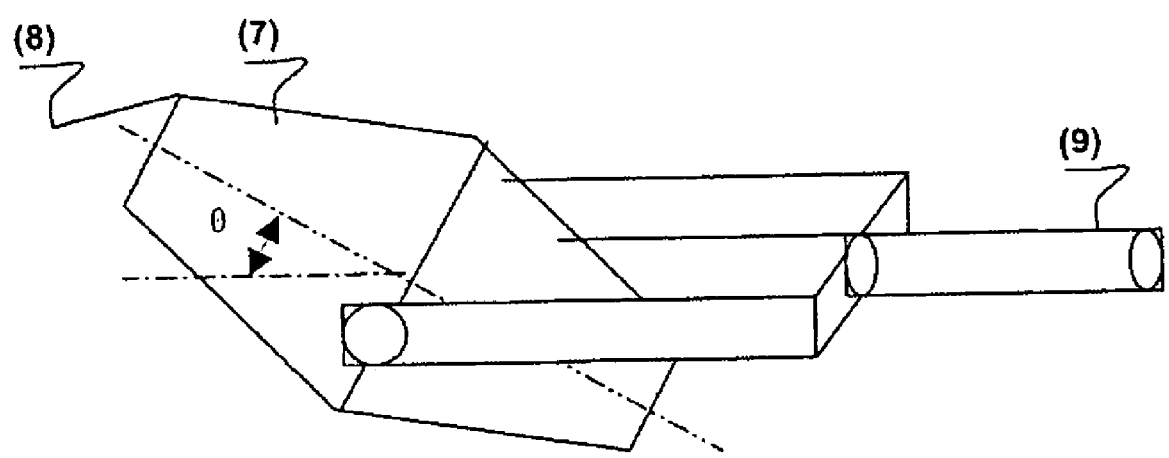
FIG. 6 is schematic perspective view of an apparatus allowing a second implementation of the invention.

The stirring may also be performed in a rotating bicone such as the one depicted in FIG. 6. This bicone (7), equipped with an opening (8) set in rotation via a shaft (9). The axis of the bicone being able to adopt an inclination θ that can vary according to the operation concerned: Loading with chopped strands θ=45°, adding water θ=0°, unloading at the end of pelletizing θ=90°. By way of example, this bicone can operate at a ° rotational frequency about the shaft 9 of 30 revolutions per minute.

Use may also be made of a pelleting plate, an inclined cylinder open at both ends, a fixed cylinder where the fibers are set in motion through a vortex effect.

Before the stirring operation, the ingredients of the compound to be stirred are introduced into the stirring equipment. There are therefore introduced:

the chopped sized strands, and at least one film-forming agent, and water to represent 10 to 25 wt % of the total mass of said compound.

The chopped sized strands are generally wet and therefore already contribute some of the 10 to 25% of water needed for the method according to the invention.

The film-forming agent and the water are in contact with the glass strands during stirring at the latest. This means that the film-forming agent can be brought into contact with the glass strands right from the fiber-forming operation, for example during the sizing by being introduced into the sizing liquid, or may be brought into contact with the glass strands later, independently of the sizing step, by introducing it separately into the stirring apparatus, generally before stirring, or possibly during stirring.

The film-forming agent may be introduced at least partially separately from the chopped strands. However, the film-forming agent may just as easily be introduced at least partially at the same time as the strands because it is carried by the strands. This is particularly the case if the sizing liquid contains film-forming agent. All the film-forming agent needed for the stirring operation can be contributed by the strands, following its application to the strands during the sizing operation. In this case, no additional amount of film-forming agent is added to the fibers after the sizing step.

The film-forming agent may be present in an amount of 0.3 wt % to 2 wt % of the total mass to be stirred. The film-forming agent has the purpose of giving the chopped strand some cohesion (it holds the filaments together within the chopped strand). However, the film-forming agent must not prevent the filaments from separating from one another when passed through the extruder. The person skilled in the art knows which film-forming agents can be used.

The film-forming agent may thus be chosen from the following compounds:

polyester, polyurethane, an epoxy polymer, for example a polymer of diglycidyl ether of bis-phenol A, an epoxy-polyurethane copolymer.

In particular, use may be made of Neoxil 962 by DSM.

As the person skilled in the art knows, the film-forming agent needs to be selected according to the nature of the thermoplastic that is to be reinforced. For a thermoplastic of the polyester type, such as PBT or PET, use may be made of a film-forming agent of the epoxy type, particularly of a polymer of diglycidylether of bisphenol A (DGEBA). For a thermoplastic of the polyamide type, use may be made of a film-forming agent of the polyurethane type.

The water may be introduced into the stirring apparatus at least partially separately from the chopped strands. However, the water is generally also introduced at least partially at the same time at the strands because it is contributed by the strands, following the sizing operation. Specifically, the cut strands are not generally dried before the stirring step. All the water needed for the stirring operation may also be contributed by the strands, following its application to the strands particularly during the sizing operation.

If not all of the water needed for the method according to the invention is contributed by the strands when they are introduced into the equipment, this water can be added directly to the stirring equipment by any suitable means, particularly by spraying/atomizing or by adding steam. The addition of steam is a preferred way of adding water, when water needs to be added directly (without being carried by the strands) to the stirring equipment. This is because it has been found that the use of steam results in the pellets obtained being more uniform and in a higher pellet-forming rate.

If water needs to be added to the stirring apparatus independently of the chopped strands, it is possible to mix it, before introducing it into the stirring equipment, with another ingredient, for example at least some of the film-forming agent. This has an advantage when it is not desirable to apply the film-forming agent to the strands during the sizing step, for example for reasons of toxicity incompatible with the fiber drawing/sizing operation, or alternatively if the film-forming agent reacts with another ingredient in the sizing composition or is detrimental to the stability of the sizing emulsion.

The sizing operation may therefore contribute to the surface of the strands some or all of the amount of film-forming agent and total water needed. Typically, according to a preferred embodiment, all the amount of film-forming agent needed is introduced into the liquid with which the strands are sized and then no more need be added after the sizing operation. This is advantageous from the point of view that the entire method is simplified, and from the point of view that if a film-forming agent has to be added in a step subsequent to the sizing itself, for example by spraying, risks inherent to the handling of this kind of product, for example the risks of the spray nozzles becoming blocked, are run. In addition, if, during such a step subsequent to sizing, there is a desire to add some of the water needed as a mixture with this film-forming agent, it would not be possible to use steam for this addition.

The sizing operation necessarily contributes at least some of the water needed, if not all of it. In general, water is also added directly to the stirring apparatus, independently of the strands. As the strands generally contribute water in amounts of 5 to 15 wt % of the total mass to be stirred, water is generally added directly to the stirring equipment at levels of 5 to 10 wt % of the total mass to be stirred so that 10 to 25% and preferably 12 to 15% of the total mass being stirred consists of water. This is pure water, that is to say containing at least 99% water.

Thus, according to a preferred variant of the method, the size contributes all the film-forming agent and at least some of the water, and topping-up water is simply added directly to the stirring apparatus in the proportions just given. The size is therefore generally "complete" which means that it incorporates all the ingredients of a conventional sizing compound for the envisioned application, and that it is generally unnecessary to add any of these ingredients after sizing, except possibly water.

The residence time that the strands spend in the stirring apparatus in order to yield pellets is generally at least 2 min, and more generally at least 4 min, and more generally at least 8 min, for example 10 min. It is possible to stir for longer, but that is unnecessary. Thus, stirring may be achieved in under 15 min. The stirring is performed for long enough to obtain the desired pellet density.

The stirring is generally performed at ambient temperature.

As a preference, the interior surface of the stirring equipment is hydrophobic. As a preference, the interior surface of the stirring equipment is resistant to abrasion. As a preference, the interior surface of the stirring equipment is slippery enough with respect to the moving glass strands. Such properties can be provided by a coating. This coating may be made of a hydrophobic polymer such as PTFE or PVDF. It has been found that the moving strands had less of a tendency to stick to the walls if the equipment had an interior surface made of such materials, which results in better efficiency. As a preference, the interior surface has suitable roughness, for example an Ra value of 1.5.

The chopped strands are clumped together next to each other during stirring to form the pellets, without modifying their length. Thus, the pellets more or less take on the form of cylinders the lengths of which are roughly identical to the lengths of the longest strands introduced to start with.

Use may be made of chopped strands with a length ranging from 1.5 to 25 mm, particularly from 2 to 25 mm such as 2 to 15 mm and more particularly 3 mm, 4.5 mm, 5 mm, 9 mm or 12 mm.

Use may also be made, by way of strands, of a mixture of strands of different lengths.

The starting chopped strands may also contain fines because these fines play an important part in the pelletization by clumping together and entering the pellets.

The filaments contained in the strands may have a diameter ranging from 5 to 24 μm.

Stirring is performed for long enough to obtain the desired pellet diameter or the desired increase in density. The method according to the invention makes it possible to prepare pellets the density of which is at least 35%, or at least 50%, or at least 67%, or at least 80%, or at least 100%, or at least 130%, or even at least 200% greater than the density of the starting chopped strands. In general, maximum density is obtained when the pellet diameter reaches a value roughly equal to its length.

The method according to the invention makes it possible to obtain pellets having a low loss on ignition (LOI). This stems from the fact that it is possible, in the context of the present invention, to use small amounts organic compounds such as the organosilane or the film-forming agent. Thus, the pellet according to the invention may have a loss on ignition of less than 0.8% and even less than 0.5%, for example ranging from 0.1 to 0.5%, particularly ranging from 0.2 to 0.4%.

The final pellet can be defined as an object consisting of the close contact of many parallel glass filaments with individual diameters ranging from 5 to 24 μm, these filaments all having the same nominal diameter or having different nominal diameters. The number of filaments contained in a pellet may in particular range from 50 000 to 500 000 depending on the diameter of the filaments, for example 360 000 to 500 000. The filaments are tightly packed in the pellets. Table 2 below gives examples of pellets that can be obtained using the method according to the invention:

TABLE 2

| Filament diameter (μm) | Number of filaments | Diameter of the end pellet (mm) |
| --- | --- | --- |
| 5 | 5000 | 0.4 |
| 5 | 500000 | 3.5 |
| 24 | 50000 | 5.4 |
| 24 | 500000 | 17.0 |
| 5 | 5000 | 0.4 |
| 5 | 50000 | 1.1 |
| 5 | 200000 | 2.2 |
| 10 | 5000 | 0.7 |
| 10 | 50000 | 2.2 |
| 10 | 200000 | 4.5 |
| 24 | 5000 | 1.7 |
| 24 | 50000 | 5.4 |
| 24 | 200000 | 10.7 |

The pellet is generally in roughly cylindrical form, its approximate diameter ranging between 1 and 10 mm. In the case of a few very large pellets compared with the others, under magnification these may look like they are made up of two or three closely associated cylinders. In the case of pellets at least 9 mm long and longer, the cylinder in some cases may be slightly deformed, the filaments not being in contact over their entire length but having slipped along their axis, meaning that the pellets therefore have a length significantly greater than that of the starting chopped strands. For a basic chopped strand length (used to start with) of 12 mm, the pellets may thus lengthen into a point up to 16 mm long. These pellets therefore contain a roughly cylindrical central body, the base of each cylinder being extended by a point, like in an olive. Thus, for pellets at least 9 mm long, their length may be at least 10% greater than that of the starting chopped standards and therefore of the filaments they contain.

The pellets generally have a bulk density at least 67% higher than the bulk density of the starting chopped strands. They generally have roughly the same length as said starting chopped strands, especially when the length of said pellets is less than 9 mm.

The pellets contain size suited to the reinforcing of thermoplastics, said size generally having been applied to the strands before they were chopped into chopped strands.

There is no need to form a polymer jacket around the pellets to encapsulate them. This is because the pellets produced according to the invention are intact enough to be used as they are after drying. They can therefore be used as they are (dried) to feed into an extruder (or any other suitable compounding machine) which is also fed with thermoplastic (for example PE, PP, PS) generally also in the form of pellets. The fact that they are not encapsulated means that they are broken down more readily at the time of their use in order to be compounded with the thermoplastic.

Examples of Batch Pelletization

The bicone of FIG. 6, which has an internal volume of 11.5 liters, is loaded with 2000 g of chopped strands of density "dens" (see table 1). These strands comprising about 800 to 4000 10-μm filaments have been coated with size during the fiber drawing operation using a conventional applicator roller, and a sizing liquid containing an organosilane, the hydrolyzed derivative of γ-aminopropyltriethoxysilane marketed under the reference A1100 by Crompton-OSI and a film-forming agent of the polymer of diglycidyl ether of bis-phenol A type. These strands contain x wt % water (see table 1). Their loss on ignition (LOI) is y wt %. The amount of water needed to obtain the desired moisture content (see table 1) is then added in the form of steam ("V" in table 1) or by spraying ("P" in table 1). Once the cover has been closed, the bicone is placed in a θ=45° position and the device is set in continuous rotation at the speed of 30 revolutions per minute for 10 minutes.

The main characteristics of these examples are given in table 1 (operating conditions and results). This table gives:
- the characteristics of the starting chopped strands, namely:
    - their length "L" in mm,
    - their density "Dens", measured by the ISO 15100 method,
    - their water content "x" in wt %,
    - their loss on ignition (LOI) "y" in wt %;
- the way in which the water was added, namely:
    - the means: steam "V" or spraying "P",
    - the amount of water added as a wt % of the total mass for stirring,
    - the total water content at the time of stirring,
- the characteristics of the end pellet, namely:
    - their length "L" in mm,
    - their density "Dens" measured using the ISO 15100 method;
- the increase in density between the density of the starting chopped strands and the pellets.

Example of Continuous Pelletization

Figure 10:
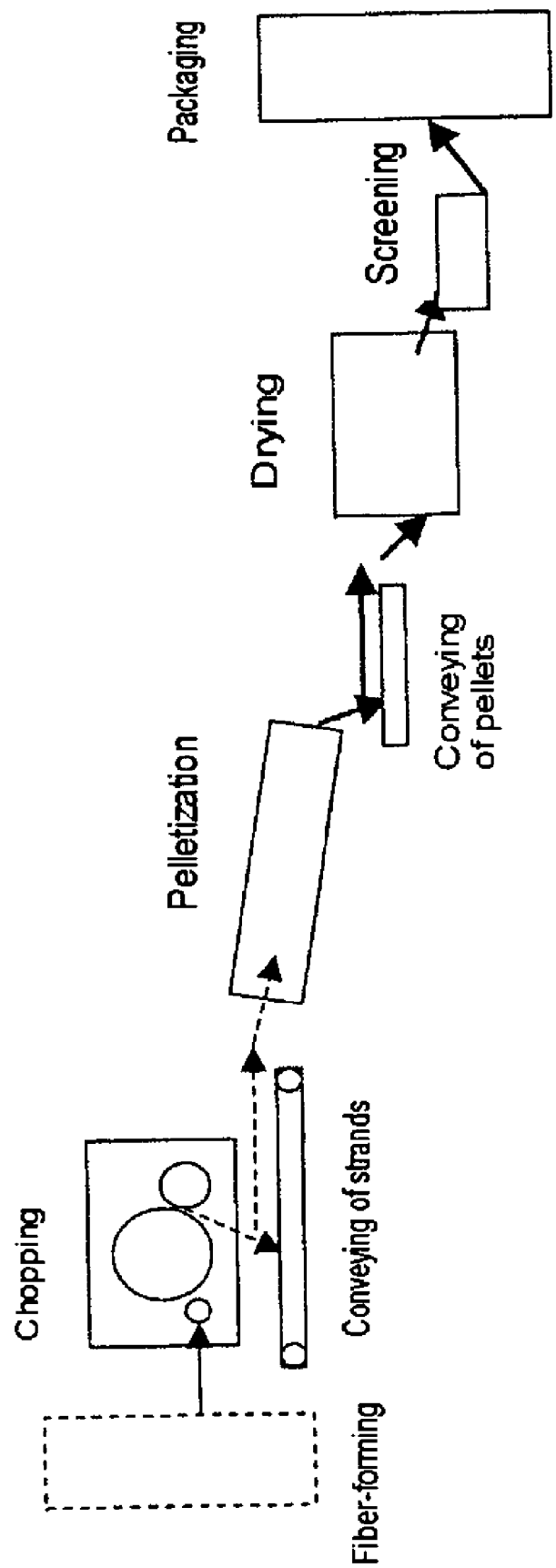
FIG. 10 is a simplified overall schematic view of a device for continuously producing glass fiber pellets according to the present invention.

Pellets are produced using the device depicted in FIG. 10. After fiber drawing during which the fibers are coated with size, the strands are chopped, the chopped strands then being conveyed to the pelletization equipment in the form of a tube, the pellets then being conveyed to the drying and then screening operations, after which the pellets are packaged.

The manufacturing conditions were as follows:

| | |
|---|---|
| Fiber drawing: | Bushing: 1200 holes |
| | Output: 650 kg/day |
| | Filament diameter: 10 μm |
| Chopped strands: | Cut length: 4.5 mm |
| | Loss on ignition: 0.69% |
| | Moisture content when cut: 14.5% |
| Pelletization: | Pelletizing tube length: 3.30 m |
| | Pelletizing tube Ø: 240 mm |
| | Tube inclination: 1.9° |
| | Rotational speed: 40 revolutions per minute |
| | Tumbling aid system (hammer): 2 blows per revolution |
| | Residence time: 2 min |
| Drying: | Fluidized bed vibrated at: 180° C. |
| | Residence time: 2 min |

The chopped strands are introduced into the moving tube directly with the correct pelletization moisture content. Table 3 collates the results:

TABLE 3

| Filament Ø (μm) | Filament length | Moisture content (wt %) | Density | Loss on ignition | Increase in density by pelletization | Mean pellet diameter (mm) | Number of filaments per pellet |
|---|---|---|---|---|---|---|---|
| 10 | 4.5 | 14.54 | 0.87 | 0.69 | 61% | 2.6 | 70000 |
| 10 | 4.5 | 12.82 | 0.95 | 0.60 | 60% | 2.8 | 80000 |
| 10 | 4.5 | 12.5 | 0.8 | 0.66 | 62% | 3.2 | 100000 |
| 10 | 4.5 | 13 | 0.93 | 0.58 | 70% | 4.5 | 200000 |
| 17 | 12 | 13.5 | 0.71 | 0.81 | 200% | 2.3 | 17000 |

TABLE 1

| | Chopped strands | | | | Added water | | Total water | Pellet | | Increase in density |
|---|---|---|---|---|---|---|---|---|---|---|
| Ex no | L (mm) | Dens | x (%) | y (%) | Means | % | (wt %) | L (mm) | Dens | % |
| 1 | 4.5 | 0.53 | 10 | 0.7 | V | 1 | 11 | 4.5 | 0.8 | 51 |
| 2 | 4.5 | 0.53 | 10 | 0.7 | V | 2 | 12 | 4.5 | 0.9 | 70 |
| 3 | 4.5 | 0.53 | 10 | 0.7 | V | 3 | 13 | 4.5 | 1 | 89 |
| 4 | 4.5 | 0.53 | 10 | 0.7 | V | 4 | 14 | 4.5 | 0.95 | 80 |
| 5 | 4.5 | 0.53 | 10 | 0.7 | V | 8 | 18 | 4.5 | 0.75 | 41 |
| 6 | 3 | 0.53 | 5 | 0.7 | V | 7 | 12 | 3 | 0.85 | 66 |
| 7 | 4.5 | 0.53 | 5 | 0.7 | V | 7 | 12 | 4.5 | 0.9 | 70 |
| 8 | 6 | 0.3 | 5 | 0.7 | V | 7 | 12 | 6 | 0.85 | 183 |
| 9 | 12 | 0.2 | 5 | 0.7 | V | 7 | 12 | 12 | 0.85 | 330 |
| 10 | 6 | 0.3 | 10 | 0.7 | V | 4 | 14 | 6 | 0.8 | 166 |
| 11 | 12 | 0.2 | 10 | 0.7 | V | 4 | 14 | 12 | 0.8 | 300 |
| 12 | 9 | 0.25 | 10 | 0.7 | P | 2 | 12 | 9 | 0.9 | 260 |
| 13 | 9 | 0.25 | 10 | 0.7 | P | 4 | 14 | 9 | 0.85 | 240 |
| 14 | 4.5 | 0.43 | 5 | 0.4 | P | 8 | 13 | 4.5 | 0.9 | 110 |
| 15 | 4.5 | 0.43 | 5 | 0.4 | V | 8 | 13 | 4.5 | 0.9 | 110 |
| 16 | 9 | 0.25 | 5 | 0.4 | P | 8 | 13 | 9 | 0.9 | 260 |
| 17 | 9 | 0.25 | 5 | 0.4 | V | 8 | 13 | 9 | 0.88 | 250 |

The invention claimed is:

1. A method for preparing glass strand pellets comprising:
adding glass to a single stirring equipment having a single stirring zone, the glass including sized chopped glass strands, the strands containing contiguous glass filaments, in a presence of 10 to 25 wt % of water, and the strands having been coated with a size containing an organosilane;
rotating the single stirring equipment to coat the glass with a film-forming agent and stir the glass for long enough to form glass fiber pellets denser than the corresponding unpelleted glass strands by at least 67%, said glass pellets being formed and densified within said single stirring zone; and
forming, from the glass, the glass strand pellets containing after drying, at least 95 wt % glass.

2. The method as claimed in claim 1, wherein the rotating comprises a tumbling operation.

3. The method as claimed in claim 2, wherein the single stirring equipment drives the strands or the forming glass strand pellets at a linear speed ranging from 0.2 to 1 meter per second.

4. The method as claimed in claim 3, wherein the single stirring equipment drives the strands or the forming glass strand pellets at a linear speed ranging from 0.3 to 0.7 meter per second.

5. The method as claimed in claim 4, wherein the single stirring equipment drives the strands or the forming glass strand pellets at a linear speed of about 0.5 meter per second.

6. The method as claimed in claim 2, further comprising:
periodically striking a hammer on an exterior surface of the single stirring equipment during the rotating to detach glass from an interior surface of the single stirring equipment.

7. The method as claimed in claim 1, wherein all of the film-forming agent is applied to the strands while they are being sized.

8. The method as claimed in claim 1, wherein the film-forming agent is present in an amount representing 0.3 wt % to 2 wt % of a total mass to be stirred.

9. The method as claimed in claim 1 wherein the water is wholly contributed by the chopped glass strands.

10. The method as claimed in claim 1, wherein the water is introduced into the single stirring equipment partly as a contribution from the strands, and partly introduced directly into the equipment independently of the strands.

11. The method as claimed in claim 10, wherein the water contributed by the strands represents 5 to 15 wt % of a mass to be stirred and the water introduced directly into the single stirring equipment represents 5 to 10 wt % of the mass to be stirred.

12. The method as claimed in claim 10, wherein the water introduced directly into the single stirring equipment is added in sprayed or atomized form.

13. The method as claimed in claim 1, wherein the strands have a length ranging from 1.5 to 15 mm.

14. The method as claimed in claim 1, wherein the chopped strands contain less than 220 ppm in terms of weight of fines comprising 1 to 10 filaments.

15. The method as claimed in claim 1, wherein the rotating stirs the glass for long enough in the single stirring equipment for the density of the glass to increase by at least 80%.

16. The method as claimed in claim 1, wherein the rotating stirs the glass for long enough in the single stirring equipment for the density of the glass to increase by at least 100%.

17. The method as claimed in claim 1, wherein the rotating stirs the glass for long enough in the single stirring equipment for the density of the glass to increase by at least 130%.

18. The method as claimed in claim 1, wherein the rotating stirs the glass for long enough in the single stirring equipment for the density of the glass to increase by at least 200%.

19. The method as claimed in claim 1, wherein the glass strand pellets have a toss on ignition of less than 0.5%.

20. The method as claimed in claim 1, wherein an interior surface of the single stirring equipment is covered with a coating made of a hydrophobic polymer.

21. The method as claimed in claim 1, wherein the stirring is performed at a constant frequency, from a starting chopped strand to an end pellet.

* * * * *